(12) United States Patent
Ribero et al.

(10) Patent No.: US 11,565,692 B2
(45) Date of Patent: Jan. 31, 2023

(54) METHOD/DEVICE FOR IMPROVING BRAKING PERFORMANCE ON WHEELED VEHICLE

(71) Applicant: Volvo Truck Corporation, Gothenburg (SE)

(72) Inventors: Raphaël Ribero, Millery (FR); Thierry Beaudiquez, Saint-Priest (FR)

(73) Assignee: Volvo Truck Corporation, Gothenburg (SE)

( * ) Notice: Subject to any disclaimer, the term of this patent is extended or adjusted under 35 U.S.C. 154(b) by 340 days.

(21) Appl. No.: 16/639,180

(22) PCT Filed: Sep. 14, 2017

(86) PCT No.: PCT/IB2017/001268
§ 371 (c)(1),
(2) Date: Feb. 14, 2020

(87) PCT Pub. No.: WO2019/053482
PCT Pub. Date: Mar. 21, 2019

(65) Prior Publication Data
US 2020/0231143 A1     Jul. 23, 2020

(51) Int. Cl.
*B60W 30/09*      (2012.01)
*B60T 7/22*        (2006.01)
(Continued)

(52) U.S. Cl.
CPC ............... *B60W 30/09* (2013.01); *B60T 7/22* (2013.01); *B60W 10/184* (2013.01);
(Continued)

(58) Field of Classification Search
None
See application file for complete search history.

(56) References Cited

U.S. PATENT DOCUMENTS 3,920,283 A * 11/1975 Strader ................. B60G 5/03
                                                280/5.513
6,540,307 B1 * 4/2003 Ward .................... B60T 8/00
                                                303/9.69
(Continued)

FOREIGN PATENT DOCUMENTS

WO     2015134231 A1    9/2015
WO     2016197068 A1   12/2016
WO     2017076435 A1    5/2017

OTHER PUBLICATIONS

International Search Report and Written Opinion for International Patent Application No. PCT/IB2017/001268, dated May 24, 2018, 11 pages.

*Primary Examiner* — Navid Z. Mehdizadeh
(74) *Attorney, Agent, or Firm* — Withrow & Terranova, PLLC

(57) ABSTRACT

The present invention provides a method/device to improve braking performance on a wheeled vehicle comprising at least one driving axle, the wheeled vehicle further comprising a collision warning system and an emergency braking system and an air suspension system, the air suspension system comprising at least one air suspension module associated with the at least one driving axle and the air suspension system being configured to control the air pressure in the at least one air suspension module associated with the at least one driving axle, the collision warning system being configured to monitor the environment of the wheeled vehicle, and to determine if and when the emergency braking system may need to be actuated, so that when the collision warning system determines the emergency braking system may need to be actuated, the method being implemented by the collision warning system and comprising one step implemented before eventually actuating the emergency braking system, said step comprising actuating the air sus- (Continued)

pension system to increase the air pressure on the at least one of air suspension module associated with the at least one driving axle.

6 Claims, 1 Drawing Sheet

(51) Int. Cl.
*B60W 10/184* (2012.01)
*B60W 10/22* (2006.01)

(52) U.S. Cl.
CPC .......... *B60W 10/22* (2013.01); *B60T 2210/32* (2013.01); *B60T 2260/06* (2013.01); *B60W 2710/18* (2013.01); *B60W 2710/223* (2013.01)

(56) References Cited

U.S. PATENT DOCUMENTS

| | | | |
|---|---|---|---|
| 9,056,537 B2* | 6/2015 | Eberling | B60W 10/18 |
| 9,573,591 B2* | 2/2017 | Matoy | B60W 10/22 |
| 2008/0145241 A1* | 6/2008 | Sabelstrom | F04B 49/02 |
| | | | 417/307 |
| 2015/0353062 A1* | 12/2015 | Breuer | B60T 7/22 |
| | | | 701/70 |

* cited by examiner

METHOD/DEVICE FOR IMPROVING BRAKING PERFORMANCE ON WHEELED VEHICLE

This application is a 35 USC 371 national phase filing of International Application No. PCT/IB2017/001268, filed Sep. 14, 2017, the disclosure of which is incorporated herein by reference in its entirety.

TECHNICAL FIELD

The invention relates to the field of advanced emergency braking systems.

BACKGROUND

To improve safety, trucks are now equipped with advanced emergency braking systems, including sensors to collect information and a safety electronic control unit to build an alerting signal for the driver in case of a dangerous traffic situation being detected, such as a risk of collision, and to actuate automatically, if necessary, an emergency braking to stop or reduce the speed of the truck before the collision occurs.

Braking performance of known advanced emergency braking systems need to be improved as much as possible, to avoid most cases of collisions risk.

SUMMARY

An object of the invention is to provide a method and a device to solve this problem.

The present invention provides a method to improve braking performance on a wheeled vehicle comprising at least one driving axle, the wheeled vehicle further comprising a collision warning system and an emergency braking system and an air suspension system, the air suspension system comprising at least one air suspension module associated with the at least one driving axle and the air suspension system being configured to control the air pressure in the at least one air suspension module associated with the at least one driving axle, the collision warning system being configured to monitor the environment of the wheeled vehicle, and to determine if and when the emergency braking system may need to be actuated, so that when the collision warning system determines the emergency braking system may need to be actuated, the method being implemented by the collision warning system and comprising one step implemented before eventually actuating the emergency braking system, said step comprising actuating the air suspension system to increase the air pressure on the at least one of air suspension module associated with the at least one driving axle.

According to an aspect of the invention, increasing the air pressure on at least one suspension module associated with the at least one driving axle increases the grip between the driving wheel attached to the at least one driving axle and the road, thus allowing a better braking performance when the emergency braking system is actuated.

According to an aspect of the invention, the collision warning system comprises at least one sensor collecting information on the environment of the wheeled vehicle, the at least one sensor being connected to a first electronic control unit configured to determine, from the information collected by the at least one sensor, if and when the emergency braking system may need to be actuated.

According to an aspect of the invention, the air suspension system comprises a second electronic control unit being connected to and configured to receive orders from the first electronic control unit, the second electronic control unit being further configured to control the air pressure in the at least one air suspension module.

According to an aspect of the invention, the second electronic control unit is configured to control the air pressure in the at least one air suspension module through electro-valves electrically connected to the second electronic control unit.

The invention also relates to a wheeled vehicle comprising at least one driving axle, the wheeled vehicle further comprising a collision warning system and an emergency braking system and an air suspension system, the air suspension system comprising at least one air suspension module associated with the at least one driving axle and the air suspension system being configured to control the air pressure in the at least one air suspension module associated with the at least one driving axle, and the collision warning system being configured to monitor the environment of the wheeled vehicle, and to determine if and when the emergency braking system may need to be actuated, so that before the emergency braking system is eventually actuated, the method according to the invention is implemented by the collision warning system.

According to an aspect of the invention, the collision warning system comprises at least one sensor configured to collect information on the environment of the wheeled vehicle, the at least one sensor being connected to a first electronic control unit configured to determine, from the information collected by the at least one sensor, if and when the emergency braking system must be actuated.

According to an aspect of the invention, the air suspension system comprises a second electronic control unit being connected to and configured to receive orders from the first electronic control unit, the second electronic control unit being further configured to control the air pressure in the at least one air suspension module.

According to an aspect of the invention, the second electronic control unit is configured to control the air pressure in the at least one air suspension module through electro-valves electrically connected to the second electronic control unit.

The invention also relates to a computer program, the computer program comprising program code means suitable for performing the method according to the invention, when the program code means are implemented on the first electronic control unit of the collision warning system of a wheeled vehicle according to the invention.

The invention also relates to computer-readable means comprising a recorded computer program according to the invention.

BRIEF DESCRIPTION OF THE DRAWINGS

Below follows a more detailed description of embodiments of the invention cited as examples, in reference to the figures.

DETAILED DESCRIPTION OF EXAMPLE EMBODIMENTS OF THE INVENTION

One embodiment of the invention will now be described by taking a truck as an example of a wheeled vehicle. But the vehicle could be any other wheeled vehicle.

Figure 1:
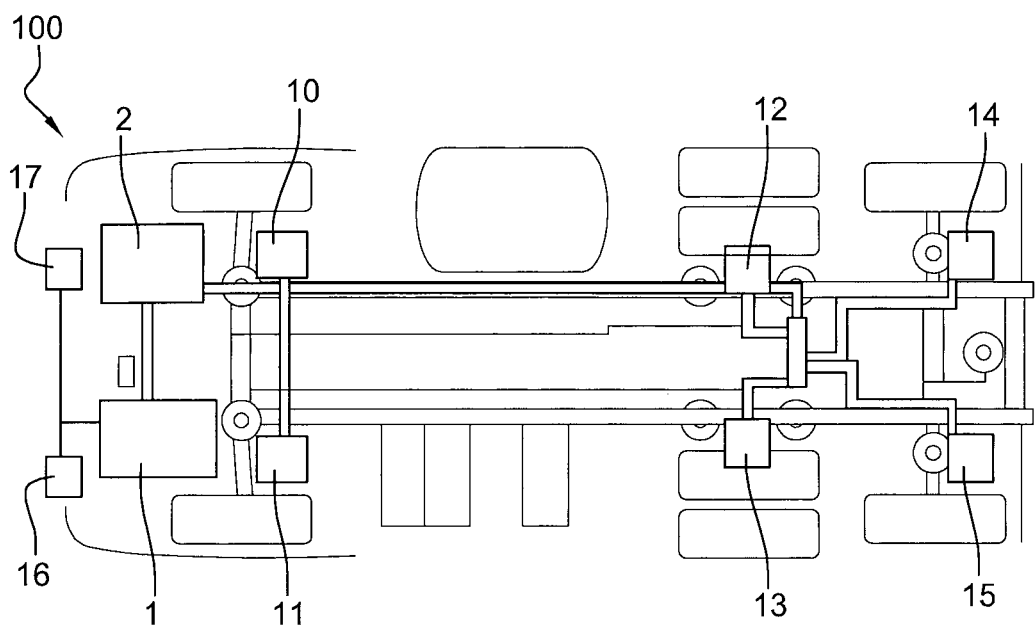
FIG. 1 is a schematic bottom view of a truck comprising three pairs of axles.

FIG. 1 represents a bottom view of a truck 100, showing in particular the wheels of the truck, each wheels being associated with an axle; an air suspension module or air pillow 10, 11, . . . , 15 is associated with each axle. Some axles are driving axle, others are simple axle. Driving axles are put in motion by the engine, through a gearbox. Simple axles are not motioned by the engine.

Also represented on FIG. 1 is a collision warning system installed on the truck 100 and composed of a first electronic control unit 1 and of sensors 16, 17 configured to gather information from the environment of the truck and communicating this information to the first electronic control unit 1 which is configured to determine from this information whether the truck is approaching a dangerous traffic situation. As an example, the sensors 16, 17 may be a radar, a lidar, and/or a camera. Information from these sensors is communicated to the first electronic control unit 1 to be processed; as a result of the processing of information communicated by the sensors, the electronic control unit determines if an alert shall be communicated to the driver as well as if the emergency braking system must be actuated.

The first electronic control unit 1 is connected to a second electronic control unit 2; the second electronic control unit 2 is configured to control the air-pressure in each air suspension module 10, 11, . . . , 15 corresponding to each axles of the truck; the air pressure in each air suspension modules is regulated through electro-valves electrically connected and controlled by the second electronic control unit 2. The air pressure regulation depends on the truck weight repartition and vehicle altitude, in order to maintain the vehicle at a correct attitude while cruising.

Figure 2:
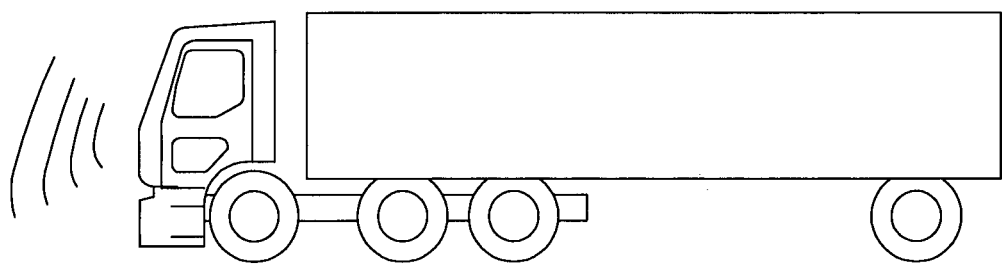
FIG. 2 is a schematic side view of a truck comprising four pairs of axles, with one pair of driving axles.

FIG. 2 illustrates the repartition of air pressure among the different axles on a truck having four pair of axles. On the example illustrated by FIG. 2, the air pressure allocated by the air suspension system to the front pair of axles is P1% of the total air pressure; the air pressure allocated by the air suspension system to the rear pair of axles is P4% of the total air pressure; the air pressure allocated by the air suspension system to the two median pair of axles is, respectively, P2% and P3% of the total air pressure.

When the air pressure allocated to a chosen axle is increased, the grip between the wheel attached to this chosen axle and the road is immediately increased; and consequently, if the grip is increased the braking performance will be improved, provided the braking is applied on this wheel.

Since the braking applies with maximum power on wheels attached to driving axles, air pressure must be increased on driving axles to improve the braking performance.

Figure 3:
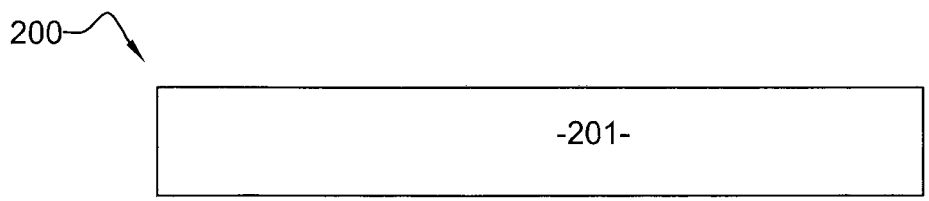
FIG. 3 is a schematic illustration of a method according to the invention.

FIG. 3 illustrates a schematic illustration of a method according to the invention. Therefore the method 200 according to the invention comprises the following step 201, implemented by the first electronic control unit 1 of the collision warning system, as soon as it has determined that the emergency braking system may need to be actuated, this step 201 being implemented before the emergency braking system is actuated:
   actuate the air suspension system to increase the air pressure on at least one of air suspension module associated with at least one driving axle.

The invention concerns also a wheeled vehicle 100, such as a truck, implementing the previously described method 200.

The invention also concerns a computer program comprising program code means suitable for performing the previously described method 200, when the program code means are implemented on the first electronic control unit 1 of the collision warning system of a wheeled vehicle 100 according to the invention, as well as computer-readable means comprising such a recorded computer program.

The invention claimed is:

1. A wheeled vehicle comprising at least one driving axle, a collision warning system, an emergency braking system, and an air suspension system comprising at least one air suspension module associated with the at least one driving axle and configured to control air pressure in the at least one air suspension module wherein:
   the collision warning system is configured to:
      monitor an environment of the wheeled vehicle,
      determine whether to actuate the emergency braking system based on the environment,
      when the collision warning system determines to actuate the emergency braking system, actuate the air suspension system to increase the air pressure on the at least one air suspension module prior to actuating the emergency braking system; and
      actuate the emergency braking system.

2. The wheeled vehicle of claim 1 wherein the collision warning system comprises a sensor for collecting information on the environment of the wheeled vehicle, and the collision warning system uses the information collected from the sensor to determine whether to actuate the emergency braking system.

3. A method of operating a collision warning system of a wheeled vehicle comprising at least one driving axle, an emergency braking system, and an air suspension system comprising at least one air suspension module associated with the at least one driving axle and configured to control air pressure in the at least one air suspension module, the method comprising:
   monitoring the environment of the wheeled vehicle,
   determining whether to actuate the emergency braking system based on the environment,
   when the collision warning system determines to actuate the emergency braking system, actuating the air suspension system to increase the air pressure on the at least one air suspension module prior to actuating the emergency braking system; and
   actuating the emergency braking system.

4. The method of claim 3 wherein the collision warning system comprises a sensor for collecting information on the environment of the wheeled vehicle, and the collision warning system uses the information collected from the sensor to determine whether to actuate the emergency braking system.

5. A non-transitory computer-readable storage medium for a collision warning system of a wheeled vehicle comprising at least one driving axle, an emergency braking system, and an air suspension system comprising at least one air suspension module associated with the at least one driving axle and configured to control air pressure in the at least one air suspension module, the non-transitory computer-readable storage medium comprising a computer program product including instructions to cause at least one processor to:
   monitor an environment of the wheeled vehicle,
   determine whether to actuate the emergency braking system based on the environment, when the collision warning system determines to actuate the emergency braking system, actuate the air suspension system to increase the air pressure on the at least one air suspension module prior to actuating the emergency braking system; and actuate the emergency braking system.

6. The non-transitory computer-readable storage medium of claim 5 wherein the collision warning system comprises a sensor for collecting information on the environment of the wheeled vehicle, and the information collected from the sensor is used to determine whether to actuate the emergency braking system.

* * * * *